US009438827B2

(12) United States Patent
Li

(10) Patent No.: US 9,438,827 B2
(45) Date of Patent: Sep. 6, 2016

(54) IMAGING SYSTEMS AND METHODS FOR GENERATING BINNED HIGH-DYNAMIC-RANGE IMAGES

(71) Applicant: Semiconductor Components Industries, LLC, Phoenix, AZ (US)

(72) Inventor: Huai Dong Li, Cupertino, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 49 days.

(21) Appl. No.: 14/459,213

(22) Filed: Aug. 13, 2014

(65) Prior Publication Data
US 2015/0062368 A1 Mar. 5, 2015

Related U.S. Application Data

(60) Provisional application No. 61/870,441, filed on Aug. 27, 2013.

(51) Int. Cl.
| | | |
|---|---|---|
| H04N 5/347 | (2011.01) | |
| H04N 5/355 | (2011.01) | |
| H04N 5/235 | (2006.01) | |
| H04N 5/353 | (2011.01) | |
| G06T 5/50 | (2006.01) | |

(52) U.S. Cl.
CPC ....... *H04N 5/347* (2013.01); *G06T 5/50* (2013.01); *H04N 5/2355* (2013.01); *H04N 5/3535* (2013.01); *H04N 5/35554* (2013.01); *G06T 2207/10144* (2013.01); *G06T 2207/20208* (2013.01); *G06T 2207/20221* (2013.01)

(58) Field of Classification Search
None
See application file for complete search history.

(56) References Cited

U.S. PATENT DOCUMENTS

| 8,446,481 | B1 | 5/2013 | Geiss | |
|---|---|---|---|---|
| 8,611,421 | B1 | 12/2013 | Efremov et al. | |
| 8,624,997 | B2 | 1/2014 | Kuang et al. | |
| 2007/0273785 | A1* | 11/2007 | Ogawa | H04N 5/2353 348/362 |
| 2013/0208138 | A1 | 8/2013 | Li et al. | |
| 2013/0242133 | A1 | 9/2013 | Li | |

\* cited by examiner

*Primary Examiner* — Mark Monk
(74) *Attorney, Agent, or Firm* — Treyz Law Group, P.C.; Michael H. Lyons

(57) ABSTRACT

Electronic devices may include image sensors that capture interleaved images having rows of long-exposure pixel values interleaved with rows of short-exposure pixel values. Processing circuitry in the electronic device may (spatially) partition the interleaved images into multiple bins. The processing circuitry may generate a weighted long-exposure pixel value for each bin and a weighted short-exposure pixel value for each bin. The weighted long and short exposure values in each bin may be combined to generate a binned high-dynamic-range (HDR) pixel value for that bin. The processing circuitry may output a binned HDR image formed from the binned HDR pixel values to additional circuitry such as video processing circuitry for performing additional image processing operations. If desired, the image sensor and processing circuitry may be combined into an integrated structure that generates a single binned HDR pixel value and multiple integrated structures may be used.

20 Claims, 6 Drawing Sheets

IMAGING SYSTEMS AND METHODS FOR GENERATING BINNED HIGH-DYNAMIC-RANGE IMAGES

This application claims the benefit of provisional patent application No. 61/870,441, filed Aug. 27, 2013 which is hereby incorporated by reference herein in its entirety.

BACKGROUND

The present invention relates to imaging devices and, more particularly, to high-dynamic-range imaging systems.

Image sensors are commonly used in electronic devices such as cellular telephones, cameras, and computers to capture images. In a typical arrangement, an electronic device is provided with an image sensor having an array of image pixels and a corresponding lens. In certain applications, it may be desirable to capture high-dynamic-range images. While highlight and shadow detail may be lost using a conventional image sensor, highlight and shadow detail may be retained using image sensors with high-dynamic-range imaging capabilities.

Common high-dynamic-range (HDR) imaging systems use an interleaved exposure image capture method. In the interleaved exposure method, interleaved images are captured having rows of long-exposure image pixel values are interleaved with rows of short-exposure image pixel values. HDR imaging systems are often used for capturing video data such as high definition videos (e.g., 1080p video). When generating video data using conventional interleaved exposure HDR imaging systems, image processing circuitry in the imaging system can consume excessive processing resources and excessive power in order to continuously output frames of high definition HDR video data.

It would therefore be desirable to be able to provide improved systems and methods for interleaved high-dynamic-range imaging.

DETAILED DESCRIPTION

Imaging systems are widely used in electronic devices such as digital cameras, computers, cellular telephones, and other electronic devices. These electronic devices may include image sensors that gather incoming light to capture an image. The image sensors may include at least one image pixel array. The pixels in the image pixel array may include photosensitive elements such as photodiodes that convert the incoming light into digital data. Image sensors may have any number of pixels (e.g., hundreds or thousands or more). A typical image sensor may, for example, have hundreds of thousands or millions of pixels (e.g., megapixels).

Figure 1:
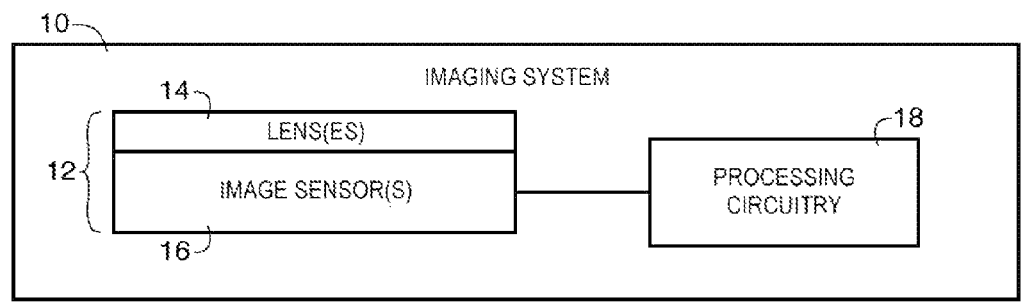
FIG. 1 shows an illustrative imaging system that can be used to capture binned high-dynamic-range images (e.g., for use in high definition video) in accordance with an embodiment of the present invention.

FIG. 1 is a diagram of an illustrative imaging system that uses an image sensor to capture images. Imaging system 10 of FIG. 1 may be a portable electronic device such as a camera, a cellular telephone, a video camera, or other imaging device that captures digital image data. Device 10 may include a camera module such as camera module 12 coupled to control circuitry such as storage and processing circuitry 18. Camera module 12 may be used to convert incoming light into digital image data. Camera module 12 may include one or more lenses 14 and one or more corresponding image sensors 16. During image capture operations, light from a scene may be focused onto each image sensors 16 using a respective lens 14. Lenses 14 and image sensors 16 may be mounted in a common package and may provide image data to processing circuitry 18.

Processing circuitry 18 may include one or more integrated circuits (e.g., image processing circuits, microprocessors, storage devices (e.g., random-access memory and non-volatile memory, etc.) and may be implemented using components that are separate from image sensor 16 and/or that form part of image sensor 16 (e.g., circuits that form part of an integrated circuit that controls or reads pixel signals from image pixels in an image pixel array on image sensor 16 or an integrated circuit within image sensor 16). Image data that has been captured by image sensor 16 may be processed and stored using processing circuitry 18. Processed image data may, if desired, be provided to external equipment (e.g., a computer, a display system, or other devices) using wired and/or wireless communications paths coupled to processing circuitry 18.

The dynamic range of an image may be defined as the luminance ratio of the brightest element in a given scene to the darkest element the given scene. Typically, cameras and other imaging devices capture images having a dynamic range that is smaller than that of real-world scenes. High-dynamic-range (HDR) imaging systems are therefore often used to capture representative images of scenes that have regions with high contrast, such as scenes that have portions in bright sunlight and portions in dark shadows.

An image may be considered an HDR image if it has been generated using imaging processes or software processing designed to increase dynamic range. As an example, HDR images may be captured by a digital camera using a multiple integration (or multiple exposure) process. In a multiple exposure process, multiple images (sometimes referred to as image frames) of the same scene may be captured using different exposure (or integration) times. A short-exposure image captured during a short integration time may better capture details of brightly lit portions of the scene, whereas a long-exposure image captured during a relatively longer integration time may better capture details of dark portions of the scene. The short-exposure and long-exposure images may be combined into a composite HDR image that accurately represents the brightly lit as well as the dark portions of the image.

When capturing HDR images using multiple exposure imaging methods, or any HDR imaging system using sequentially captured images, a moving object or stationary objects in a scene captured by a moving (e.g., shaking) camera will often be registered at different pixel positions in each image. When the images are combined, the discrepancy in position and/or shape of a moving object in the multiple exposures can result in motion artifacts in the final HDR image. In order to mitigate motion artifacts associated with an multiple exposure imaging process, HDR images may be captured by a digital camera using an interleaved integration (or interleaved exposure) process. In an interleaved exposure process, interleaved images may be captured by an image sensor. The interleaved images may have rows of long-exposure image pixel values that are interleaved (or interspersed) with rows of short-exposure image pixel values.

Figure 2:
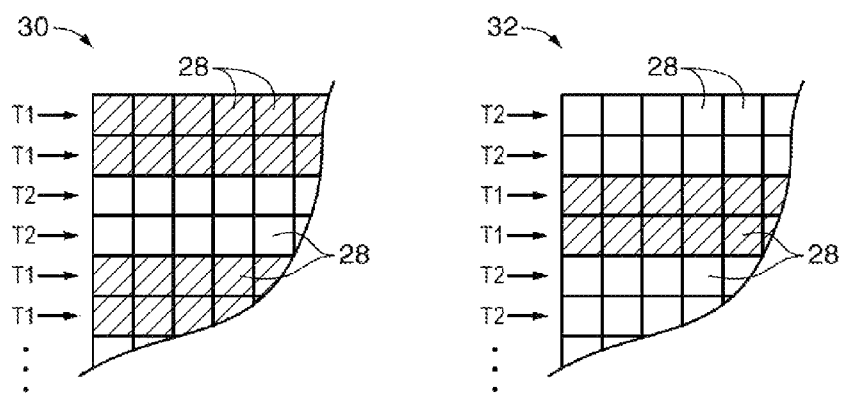
FIG. 2 is a diagram of illustrative first and second interleaved-exposure high-dynamic-range image frames each having image pixel values captured using long exposure times interspersed with image pixel values captured using short exposure times in accordance with an embodiment of the present invention.

FIG. 2 is an illustrative diagram showing interleaved HDR images that may be generated by image sensor 16 of FIG. 1. As shown in FIG. 2, image sensor 16 may capture interleaved images 30 and 32 from a scene. Interleaved image 30 may have rows of pixel values 28 (sometimes referred to herein as image pixel values, image sensor pixel values, captured pixel values, or collectively as pixel data) captured using short-exposure time T1 interleaved with rows of pixel values 28 captured using long-exposure time T2. Interleaved images such as interleaved images 30 and 32 may be captured by alternating exposure times for every two rows of image pixels 28. In the example of FIG. 2, the first pair of rows in interleaved image 30 are captured using short-exposure time T1, the second pair of rows in interleaved image 30 are captured using long-exposure time T2, the third pair of rows in interleaved image 30 are captured using short-exposure time T1, etc.

Interleaved image 32 is an example of another possible interleaved image that may be generated by image sensor 16. In the example of FIG. 2, the first pair of rows in interleaved image 32 are captured using long-exposure time T2, the second pair of rows are captured using short-exposure time T1, the third pair of rows are captured using long-exposure time T2, etc. If desired, image sensor 16 may capture interleaved images 30 and 32 sequentially or concurrently (e.g., simultaneously). Processing circuitry 18 may process one or both of interleaved images 30 and 32 for generating a final HDR image. For example, processing circuitry 18 may perform interpolation operations on image frames 30 and/or 32 to generate long-exposure and short-exposure pixel values for each row of the image frame and may combine selected regions of long-exposure and short-exposure pixel values for outputting a final HDR image. The example of FIG. 2 is merely illustrative. In general, any desired number or rows of short-exposure pixel values may be interleaved with any desired number of rows of long-exposure pixel values and image sensor 16 may capture interleaved images having any desired arrangement of short-exposure and long-exposure pixel value rows.

If desired, image sensor 16 may capture HDR video data. For example, image sensor 16 may capture video data as a sequence of frames of interleaved pixel values (e.g., frames such as images 30 and/or 32 of FIG. 2). When performing image processing operations on captured interleaved image frames for generating HDR video data, processing circuitry 18 may require excessive processing resources to continuously output a stream of HDR video frames based on the captured interleaved images (e.g., especially when outputting high definition video data such as 1080p video data). It may therefore be desirable to be able to provide improved systems and methods for capturing HDR image data.

If desired, processing circuitry 18 may perform pixel value binning on the captured frames of image data by combining pixel values from different portions of the captured image into corresponding "bins" (sometimes referred to herein as zones, groupings, or partitions of pixel values). Processing circuitry 18 may generate a binned HDR image that has a reduced size relative to the captured interleaved HDR image. The binned HDR image may allow for reduced power consumption in imaging system 10 when generating image data such as HDR video data relative to systems that process raw interleaved image frames.

Figure 3:
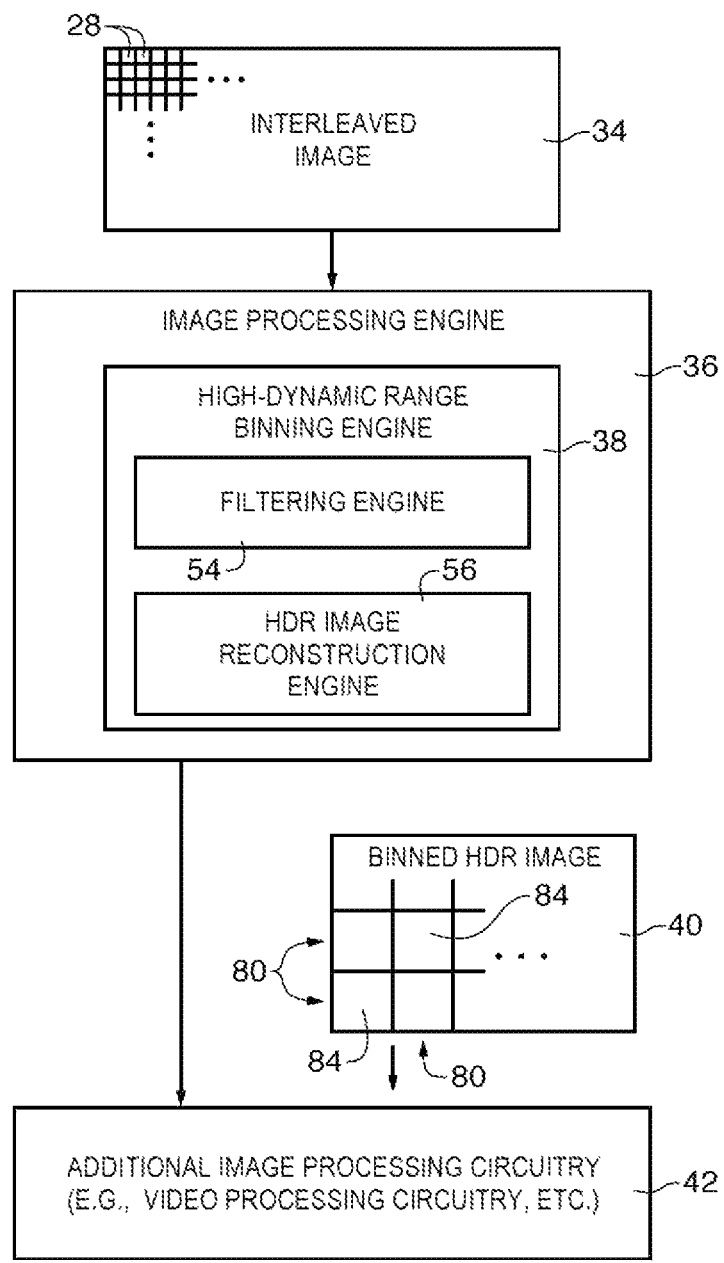
FIG. 3 is a flow diagram showing how various processing engines in an imaging system may be used to process interleaved-exposure high-dynamic-range images to generate binned high-dynamic-range images in accordance with an embodiment of the present invention.

FIG. 3 is an illustrative flow diagram that shows how processing circuitry in imaging system 10 may process captured interleaved images for generating a binned HDR image (e.g., for generating high-definition HDR video data using captured interleaved image frames while limiting power and resource consumption within the imaging system). As shown in FIG. 3, an interleaved image frame 34 of pixel values 28 may be captured using image sensor 16. Interleaved image 34 may, for example, be an interleaved image frame having alternating pairs of rows with long and short exposure times such as image frame 30 or 32 of FIG. 2. Interleaved image 34 may be passed to image processing engine 36 for processing.

Image processing engine 36 may include image processing circuitry such as processing circuitry 18 of FIG. 1, image processing circuitry formed on image sensor 16, or other processing circuitry on device 10 (e.g., image processing engine 36 may be implemented as a part of image processing circuitry 18, may be formed on a common integrated circuit substrate as processing circuitry 18, on a common integrated circuit substrate as image sensor 16, on a dedicated integrated circuit substrate that is separate from processing circuitry 18 and image sensor 16, etc.). As an example, image processing engine 36 may be formed from readout circuitry on image sensor 16 that is used for reading out pixel values from an array of image sensor pixels in image sensor 16.

Image processing engine 36 may receive interleaved image 34 from image sensor 16 (e.g., from a pixel array on image sensor 16). Image processing engine 36 may include high-dynamic-range binning engine 38 that generates binned high-dynamic-range image 40 (sometimes referred to herein as a downsized HDR image or a fused HDR image) based on interleaved image 34. For example, binning engine 38 may group pixel values 28 into corresponding pixel value bins 80 in binned HDR image 40 (e.g., by filtering and/or combining pixel values in portions or regions of the interleaved image that each correspond to a pixel value bin 80 in binned HDR image 40). Binning engine 38 may generate a binned HDR pixel value 84 for each pixel value bin in HDR image 40 based on the pixel values 28 corresponding to that group (bin) 80 of pixel values. If desired, bins 80 may overlap across interleaved image 34 (e.g., so that multiple bins include common pixel values from the interleaved image).

Binning circuitry 38 may include filtering circuitry such as filtering engine 54. Filtering engine 54 may, for example, perform linear combination operations on short-exposure and long-exposure pixel values in each bin 80 to generate a weighted short-exposure pixel value and a weighted long-exposure pixel value for each bin 80. Binning circuitry 38 may include HDR image reconstruction engine 56. Reconstruction engine 56 may combine the weighted short-exposure pixel value with the weighted long-exposure pixel value in each bin 80 to generate a corresponding binned HDR pixel value 84 for each pixel value bin 80 in binned HDR image 40 (e.g., binned HDR image 40 may include a number of pixel value bins 80 that have a corresponding binned HDR pixel value 84 as determined by binning engine 38).

Binned HDR image 40 may be passed to additional image processing circuitry 42 for further processing. Additional processing circuitry 42 may be formed as a part of image sensor 16, as a part of processing circuitry 18, or as dedicated processing circuitry that is formed separately from image sensor 16 and processing circuitry 18. Additional processing circuitry 42 may, for example, include video processing circuitry for outputting video data (e.g., a stream of binned HDR image frames) for display using display equipment or to other image processing circuitry. While binned HDR image 40 may have a reduced resolution compared to interleaved input image 34, binned HDR image 40 may require fewer processing resources and less processing power for generating and processing a stream of HDR video frames using additional image processing circuitry 42 than in scenarios where circuitry 42 outputs raw interleaved-exposure frames 34 or other un-binned video data.

Image sensor 16 may include a color filter array of color filter elements that each pass a corresponding color of light onto a corresponding image pixel when generating interleaved image 34 (e.g., red color filter elements may pass red light onto a corresponding image pixel, green color filter elements may pass green light, etc.). In this way, each image pixel in sensor 16 may generate a pixel value 28 in response to light of a selected color. For example, image sensor 16 may be provided with a color filter array arranged in a Bayer mosaic pattern in which a unit cell of two green pixel values diagonally opposite one another and adjacent to a red image pixel value diagonally opposite to a blue image pixel value is repeated across the pixel array. In this way, image sensor 16 may generate green pixel values in response to green light (e.g., using pixels provided with a green color filter element), red pixel values in response to red light (e.g., using pixels provided with a red color filter element), and blue pixel values in response to blue light (e.g., using pixels provided with a blue color filter element).

This example is merely illustrative. In general, image sensor 16 may be provided with an array of repeating color filter elements of any desired colors (e.g., yellow elements, cyan elements, magenta elements, violet elements, infrared elements, ultraviolet elements, clear elements, etc.) or an array of color filter elements having any desired arrangement or pattern. For example, image sensor 16 may include a color filter array of color filter elements arranged in a Bayer mosaic pattern, but where the green color filter elements are replaced with clear or yellow color filter elements, if desired.

If desired, image processing engine 36 may be combined with image sensor 16 in imaging system 10 to form an HDR image sensor that groups pixel values to output a single binned pixel value. For example, each binned pixel value 84 in the output binned HDR image 40 may be generated by a corresponding image sensor having associated image processing circuitry 36 for filtering and reconstructing the pixel values generated by the corresponding pixel array into a single binned pixel value (e.g., a first binned value 84 may be generated by a first image sensor 16 having a first image processing engine 36, a second binned value 84 may be generated by a second image sensor 16 having a second image processing engine 36, etc.). Additional processing circuitry such as circuitry 42 may combined binned pixel values 84 generated by each combined image sensor/image processing engine (e.g., each HDR image sensor) into a final binned HDR image.

Figure 4:
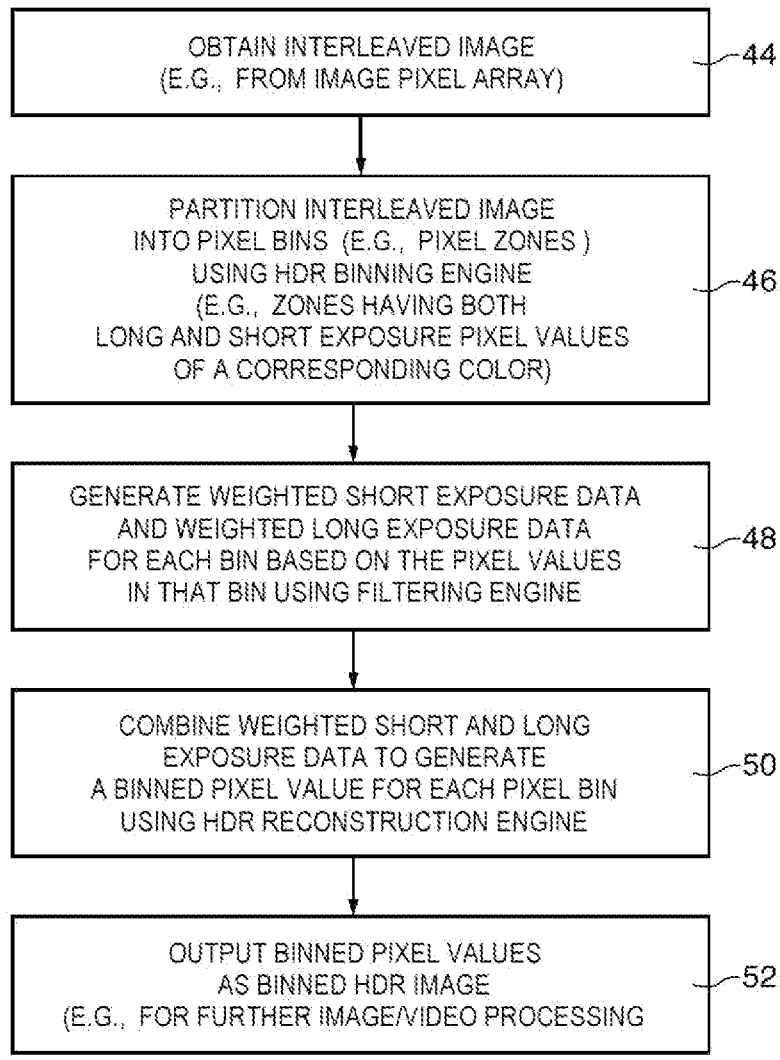
FIG. 4 is a flow chart of illustrative steps that may be performed by image processing engines for generating binned high-dynamic-range images based on interleaved-exposure high-dynamic-range images in accordance with an embodiment of the present invention.

FIG. 4 is a flow chart of illustrative steps that may be performed by image processing circuitry such as engine 36 of FIG. 3 for generating binned HDR images such as image 40 based on pixel values 28 in interleaved HDR image frames 34. The steps of FIG. 4 may, for example, be performed by processing engine 36 after image sensor 16 has captured an HDR image frame having interleaved exposure times.

At step 44, image processing engine 36 may obtain interleaved image 34 having pixel values 28 from image sensor 16 (e.g., from an array of image sensor pixels in image sensor 16). Interleaved image 34 may have alternating pairs of long-exposure and short-exposure pixel value rows.

At step 46, HDR binning engine 38 in image processing circuitry 36 may partition (group) interleaved image 34 into pixel value bins 80 (sometimes referred to herein as pixel value groups or pixel value zones). Each pixel value zone 80 may include a number of adjacent pixel values 28 spanning both long and short exposure time pixel rows in interleaved image 34. Each pixel value zone 80 may include the same number of rows and columns of pixel values 28 in interleaved image 34 (e.g., each zone 80 may include three pixel values by three pixel values, three pixel values by two pixel values, etc.). If desired, HDR binning engine 38 may form pixel value bins 80 so that each bin includes both long and short exposure pixel values of a corresponding color (e.g., so that each pixel value group 80 includes both long and short exposure red pixel values, both long and short exposure green pixel values, or both long and short exposure blue pixel values). If desired, engine 38 may form pixel value bins 80 so that each bin includes both long and short exposure pixel values of a corresponding color, where the pixel values of the corresponding color are arranged symmetrically about the center of each zone. By partitioning pixel values 28 into bins in which a corresponding color pixel value has both long and short exposure pixel values, binning engine 38 may ensure that accurate long and short exposure filtered pixel values may be generated for each bin. Bins 80 may include pixel values 28 arranged in any desired pattern. For example, each bin may include three rows by three columns of pixel values 28, three rows by two columns of pixel values 28, or any other desired number of rows and columns of pixel values.

At step 48, filtering engine 54 may generate a weighted short exposure pixel value and a weighted long exposure pixel value for each pixel bin 80 (sometimes referred to herein as filtered short exposure and filtered long exposure pixel values, respectively). The weighted short and long exposure pixel values may be generated based on pixel values 28 of a corresponding color in bin 80. For example, the weighted short exposure pixel value for a given bin may be generated as a weighted average (e.g., linear combination) of short exposure pixel values of a corresponding color in that bin (e.g., the weighted short exposure pixel value may be generated as a weighted average of short-exposure red pixel values in that bin, a weighted average of short-exposure blue pixel values in that bin, etc.). The weighted long exposure pixel value for the given bin may be generated as a weighted average of long exposure pixel values of the corresponding color in that bin (e.g., the weighted long exposure pixel value may be generated as a weighted average of long-exposure red pixel values in that bin, etc.).

At step 50, HDR image reconstruction engine 56 may combine the weighted short and long exposure pixel values generated for each bin to generate binned HDR pixel values 84 for binned HDR image 40. For example, HDR reconstruction engine 56 may combine the weighted short and long exposure pixel values for a first bin 80 to generate a first binned HDR pixel value 84 for binned HDR image 40, may combine the weighted short and long exposure pixel values for a second bin 80 to generate a second binned HDR pixel value 84 for binned HDR image 40, etc.

At step 52, image processing engine 36 may output binned HDR image 40 to additional image processing circuitry 42. Additional image processing circuitry 42 may perform image and/or video processing operations on output binned HDR image 40.

Figure 5:
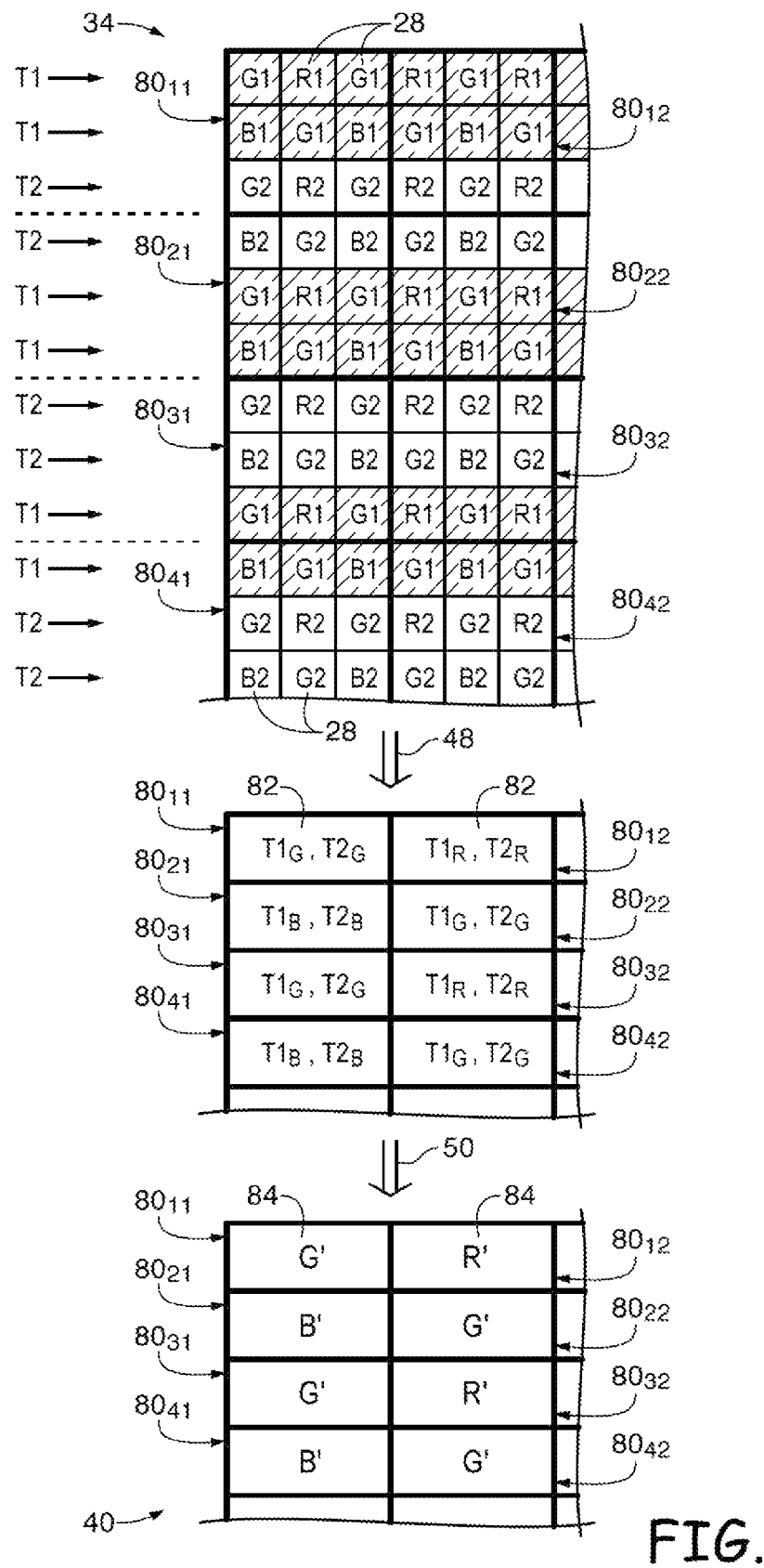
FIGS. 5 and 6 are illustrative diagrams showing how pixel values in an interleaved image frame may grouped into corresponding regions, filtered, and combined for generating binned high-dynamic-range images using image processing engines in accordance with an embodiment of the present invention.

FIG. 5 is a diagram showing an example of how HDR binning engine 38 may generate binned HDR image 40 from an interleaved image 34 having pixel values arranged in a Bayer mosaic pattern (e.g., pixel values captured using a Bayer mosaic color filter array).

As shown in FIG. 5, binning engine 38 may receive interleaved image 34 from image sensor 16. Interleaved image 34 may include alternating pairs of short exposure pixel rows (e.g., pixel value rows having short-exposure pixel values 28 captured using short exposure time T1) and long-exposure pixel rows (e.g., pixel value rows having long-exposure pixel values 28 captured using long-exposure time T2). In the example of FIG. 5, interleaved image 34 includes short-exposure green pixel values G1 captured using green image pixels (e.g., pixels in image sensor 16 provided with a green color filter element), short-exposure red pixel values R1 captured using red image pixels, short-exposure blue pixel values B1 captured using blue image pixels, long-exposure green pixel values G2 captured using green image pixels, long-exposure red pixel values R2 captured using red image pixels, and long-exposure blue pixel values B2 captured using blue image pixels.

Binning engine 38 may partition interleaved image 34 (e.g., while processing step 46 of FIG. 4) into multiple pixel value bins 80 (e.g., into a first bin $80_{11}$, a second bin $80_{12}$, a third bin $80_{21}$, a fourth bin $80_{22}$, etc.). In the example of FIG. 5, engine 38 partitions interleaved image 34 into bins 80 each including nine pixel values 28 arranged in three rows and three columns. Binning engine 38 may form partitions 80 such that each bin 80 has both long and short exposure pixel values of a corresponding color and such that pixel values of the corresponding color are symmetrically arranged around the center of the partition. For example, engine 38 may identify a first bin $80_{11}$ having both long-exposure green pixel values G2 and short-exposure green pixel values G1 arranged symmetrically around the center of bin $80_{11}$, may identify a second bin $80_{12}$ having both long-exposure red pixel values R2 and short-exposure red pixel values R1 arranged symmetrically around the center of bin $80_{12}$, may identify a third bin $80_{21}$ having both long-exposure blue pixel values B2 and short-exposure blue pixel values B1, may identify a fourth bin $80_{22}$ having both long-exposure green pixel values G2 and short-exposure green pixel values G1, etc. In this way, each bin (zone) 80 may correspond to a particular color (e.g., the color for which that bin has both long and short exposure pixel values arranged symmetrically around the center of the bin) that is to be used for generating a corresponding binned HDR pixel value (e.g., the binned HDR value may only include pixel data associated with a single corresponding color).

Filtering engine 54 may process interleaved image 34 (e.g., while performing the operations of step 48 of FIG. 4) to generate weighted short and long exposure pixel values 82 for each bin 80 (e.g., a corresponding weighted long-exposure pixel value and a corresponding weighted short-exposure pixel value may be computed for each bin 80). Weighted pixel values 82 may be generated by performing a weighted average of corresponding pixel values 28 in the corresponding bin 80 (e.g., a weighted long-exposure pixel value may be generated using a weighted average of long-exposure pixel values in that bin 80, a weighted short-exposure pixel value may be generated using a weighted average of short-exposure pixel values in that bin 80, etc.). In the example of FIG. 5, filtering engine 54 may generate a weighted short-exposure green pixel value $T1_G$ for first bin $80_{11}$ (e.g., by performing a weighted average of short-exposure green pixel values G1 in bin $80_{11}$) and may generate a weighted long-exposure green pixel value $T2_G$ for first bin $80_{11}$ (e.g., by performing a weighted average of long-exposure green pixel values G2 in bin $80_{11}$), filtering engine 54 may generate a weighted short-exposure red pixel value $T1_R$ for second bin $80_{12}$ (e.g., by performing a weighted average of short-exposure red pixel values R1 in bin $80_{12}$) and may generate a weighted long-exposure red pixel value $T2_R$ for second bin $80_{12}$ (e.g., by performing a weighted average of long-exposure red pixel values R2 in bin $80_{12}$), filtering engine 54 may generate a weighted short-exposure blue pixel value $T1_B$ for third bin $80_{21}$ (e.g., by performing a weighted average of short-exposure blue pixel values B1 in bin $80_{21}$) and may generate a weighted long-exposure blue pixel value $T2_B$ for third bin $80_{21}$ (e.g., by performing a weighted average of long-exposure blue pixel values B2 in bin $80_{21}$), etc.

If desired, pixel values 28 located near to the center of each bin 80 may be weighted more heavily than pixel values 28 located far from the center of the bin when generating the weighted pixel values. If desired, filtering engine 54 may perform different weighted averages for bins 80 based on the arrangement of long and short exposure rows within the bin and based on which color has both long and short exposure pixel values in the bin (e.g., different weighted averages having different weighting factors). For example, filtering engine 54 may perform first weighted averages for bin $80_{11}$, second weighted averages for bin $80_{12}$, third weighted averages for bin $80_{21}$, fourth weighted averages for bin $80_{22}$, fifth weighted averages for bin $80_{31}$, sixth weighted averages for bin $80_{32}$, seventh weighted averages for bin $80_{41}$, eighth weighted averages for bin $80_{42}$, etc.

If desired, the relative position of each pixel value in a corresponding bin may be labeled by the row q and column p of the associated bin in which the pixel value is located. As an example, the green pixel values in bins 80 having both long and short-exposure green pixel values may each be labeled based on their relative location within the corresponding bin 80. The green pixel value G1/G2 located in the top-left corner of a given bin 80 may be labeled $G_{p-1,q-1}$, the green pixel value G1/G2 located in the top-right corner of the bin may be labeled $G_{p+1,q-1}$, the green pixel value G1/G2 located in the center of the bin may be labeled $G_{p,q}$, the green pixel value G1/G2 located in the bottom-left corner of the bin may be labeled $G_{p-1,q+1}$, and the green pixel value G1/G2 located in the bottom-right corner of the bin may be labeled $G_{p+1,q+1}$.

Filtering circuitry 54 may generate the weighted short-exposure green pixel value $T1_G$ and weighted long-exposure green pixel value $T2_G$ for pixel value bins 80 having long and short exposure green pixel values and two short exposure rows followed by a single long exposure row (e.g., the weighted green pixel value for a bin such as bin $80_{11}$) by computing a weighted average (weighted sum or linear combination) of the long exposure green pixel values (e.g., for generating weighted long-exposure green pixel value $T2_G$)

and a weighted average of the short-exposure green pixels values (e.g., for generating weighted short-exposure green pixel value $T1_G$) in that bin. For example, filtering circuitry 54 may generate weighted short-exposure green pixel value $T1_G$ for bin $80_{11}$ by computing $T1_G=(2*G_{p,q}+G_{p-1,q-1}+G_{p+1,q-1})/4$ and may generate weighted long-exposure green pixel value $T2_G$ for bin $80_{11}$ by computing $T2_G=(G_{p-1,q+1}+G_{p+1,q+1})/2$ (where each value G can include either a short exposure value G1 or a long exposure value G2 depending on which pixel value is at that location). In this example, center value $G_{p,q}$ is weighted more heavily than the other green pixel values in the bin.

Filtering circuitry 54 may generate the weighted short-exposure green pixel value $T1_G$ and weighted long-exposure green pixel value $T2_G$ for pixel value bins 80 having long and short exposure green pixel values and a single long exposure row followed by two short exposure rows (e.g., the weighted green pixel value for a bin such as bin $80_{22}$) by computing a weighted average of the long-exposure green pixel values short-exposure green pixels values in that bin. For example, filtering circuitry 54 may generate weighted short-exposure green pixel value $T1_G$ for bin $80_{22}$ by computing $T1_G=(2*G_{p,q}+G_{p-1,q+1}+G_{p+1,q+1})/4$ and may generate weighted long-exposure green pixel value $T2_G$ for bin $80_{22}$ by computing $T2_G=(G_{p-1,q-1}+G_{p+1,q-1})/2$.

Filtering circuitry 54 may generate the weighted short-exposure green pixel value $T1_G$ and weighted long-exposure green pixel value $T2_G$ for pixel value bins 80 having long and short exposure green pixel values and two long exposure rows followed by a single short exposure rows (e.g., the weighted green pixel value for a bin such as bin $80_{31}$) by computing a weighted average of the long-exposure green pixel values short-exposure green pixels values in that bin. For example, filtering circuitry 54 may generate weighted short-exposure green pixel value $T1_G$ for bin $80_{31}$ by computing $T1_G=(G_{p-1,q+1}+G_{p+1,q+1})/2$ and may generate weighted long-exposure green pixel value $T2_G$ for bin $80_{31}$ by computing $T2_G=(2*G_{p,q}+G_{p-1,q-1}+G_{p+1,q-1})/4$.

Filtering circuitry 54 may generate the weighted short-exposure green pixel value $T1_G$ and weighted long-exposure green pixel value $T2_G$ for pixel value bins 80 having long and short exposure green pixel values and a single short exposure row followed by two long exposure rows (e.g., the weighted green pixel value for a bin such as bin $80_{42}$) by computing a weighted average of the long-exposure green pixel values short-exposure green pixels values in that bin. For example, filtering circuitry 54 may generate weighted short-exposure green pixel value $T1_G$ for bin $80_{42}$ by computing $T1_G=(G_{p-1,q-1}+G_{p+1,q-1})/2$ and may generate weighted long-exposure green pixel value $T2_G$ for bin $80_{42}$ by computing $T2_G=(2*G_{p,q}+G_{p-1,q+1}+G_{p+1,q+1})/4$.

If desired, the red pixel values in bins 80 having both long and short-exposure red pixel values may each be labeled based on their relative location within the corresponding bin 80. For example, the red pixel value R1/R2 located in the top-left corner of a given bin 80 may be labeled $R_{p-1,q-1}$, the red pixel value R1/R2 located in the top-right corner of the bin may be labeled $R_{p+1,q-1}$, the red pixel value R1/R2 located in the bottom-left corner of the bin may be labeled $R_{p-1,q+1}$, and the red pixel value R1/R2 located in the bottom-right corner of the bin may be labeled $R_{p+1,q+1}$.

Filtering circuitry 54 may generate the weighted short-exposure red pixel value $T1_R$ and weighted long-exposure red pixel value $T2_R$ for pixel value bins 80 having long and short exposure red pixel values and two short exposure rows followed by a single long exposure row (e.g., the weighted red pixel value for a bin such as bin $80_{12}$) by computing a weighted average of the long exposure red pixel values and a weighted average of the short-exposure red pixels values in that bin. For example, filtering circuitry 54 may generate weighted short-exposure red pixel value $T1_R$ for bin $80_{12}$ by computing $T1_R=(R_{p-1,q-1}+R_{p+1,q-1})/2$ and may generate weighted long-exposure red pixel value $T2_R$ for bin $80_{12}$ by computing $T2_R=(R_{p-1,q+1}+R_{p+1,q+1})/2$.

Filtering circuitry 54 may generate the weighted short-exposure red pixel value $T1_R$ and weighted long-exposure red pixel value $T2_R$ for pixel value bins 80 having long and short exposure red pixel values and two long exposure rows followed by a single short exposure row (e.g., the weighted red pixel value for a bin such as bin $80_{32}$) by computing a weighted average of the long exposure red pixel values and a weighted average of the short-exposure red pixels values in that bin. For example, filtering circuitry 54 may generate weighted short-exposure red pixel value $T1_R$ for bin $80_{32}$ by computing $T1_R=(R_{p-1,q+1}+R_{p+1,q+1})/2$ and may generate weighted long-exposure red pixel value $T2_R$ for bin $80_{32}$ by computing $T2_R=(R_{p-1,q-1}+R_{p+1,q-1})/2$.

If desired, the blue pixel values in bins 80 having both long and short-exposure blue pixel values may each be labeled based on their relative location within the corresponding bin 80. For example, the blue pixel value B1/B2 located in the top-left corner of a given bin 80 may be labeled $B_{p-1,q-1}$, the blue pixel value B1/B2 located in the top-right corner of the bin may be labeled $B_{p+1,q-1}$, the blue pixel value B1/B2 located in the bottom-left corner of the bin may be labeled $B_{p-1,q+1}$, and the blue pixel value B1/B2 located in the bottom-right corner of the bin may be labeled $B_{p+1,q+1}$.

Filtering circuitry 54 may generate the weighted short-exposure blue pixel value $T1_B$ and weighted long-exposure blue pixel value $T2_B$ for pixel value bins 80 having long and short exposure blue pixel values and a single long exposure rows followed by a two short exposure rows (e.g., the weighted blue pixel value for a bin such as bin $80_{21}$) by computing a weighted average of the long exposure blue pixel values and a weighted average of the short-exposure blue pixels values in that bin. For example, filtering circuitry 54 may generate weighted short-exposure blue pixel value $T1_B$ for bin $80_{21}$ by computing $T1_B=(B_{p-1,q+1}+B_{p+1,q+1})/2$ and may generate weighted long-exposure blue pixel value $T2_B$ for bin $80_{21}$ by computing $T2_B=(B_{p-1,q-1}+B_{p+1,q-1})/2$.

Filtering circuitry 54 may generate the weighted short-exposure blue pixel value $T1_B$ and weighted long-exposure blue pixel value $T2_R$ for pixel value bins 80 having long and short exposure blue pixel values and a single short exposure row followed by two long exposure rows (e.g., the weighted red pixel value for a bin such as bin $80_{41}$) by computing a weighted average of the long exposure blue pixel values and a weighted average of the short-exposure blue pixels values in that bin. For example, filtering circuitry 54 may generate weighted short-exposure blue pixel value $T1_B$ for bin $80_{41}$ by computing $T1_B=(B_{p-1,q-1}+B_{p+1,q-1})/2$ and may generate weighted long-exposure blue pixel value $T2_B$ for bin $80_{41}$ by computing $T2_B=(B_{p-1,q+1}+B_{p+1,q+1})/2$.

In this way, filtering circuitry 54 may generate weighted long and short exposure pixel values 82 for each pixel bin 80. Filtering circuitry 54 may pass the weighted long and short exposure pixel values to HDR image reconstruction engine 56. HDR reconstruction engine 56 may combine the long and short weighted pixel values in each bin 80 to generate binned HDR pixel values 84 of binned HDR image 40 (e.g., a green binned HDR pixel value G' for bin $80_{11}$, a red binned HDR pixel value R' for bin $80_{12}$, a blue binned HDR pixel value B' for bin $80_{21}$, etc.). For example, each binned HDR value 84 may be generated as a linear combination of the weighted short and long exposure pixel values in the corresponding bin.

In one embodiment, binned pixel values 84 in binned HDR image 40 for a corresponding bin 80 may be determined using the following equations:

$$G' = \begin{cases} T1_G, & \text{if } T1_G < S_1 \\ X^*T2_G, & \text{if } T1_G \geq S_2 \\ (1-K_{C1})^*X^*T2_G + K_{C1}^*T1_G & \text{if } S_1 \leq T1_G < S_2 \end{cases} \quad (1)$$

$$B' = \begin{cases} T1_B, & \text{if } T1_B < S_1 \\ X^*T2_B, & \text{if } T1_B \geq S_2 \\ (1-K_{C2})^*X^*T2_B + K_{C2}^*T1_B & \text{if } S_1 \leq T1_B < S_2 \end{cases} \quad (2)$$

$$R' = \begin{cases} T1_R, & \text{if } T1_R < S_1 \\ X^*T2_R, & \text{if } T1_R \geq S_2 \\ (1-K_{C3})^*X^*T2_R + K_{C3}^*T1_R & \text{if } S_1 \leq T1_R < S_2 \end{cases} \quad (3)$$

where X is a ratio of exposure times T1 and T2 with which interleaved image 34 was captured, where $S_1$ and $S_2$ are preselected thresholds (e.g., knee points) for the HDR linear combination, and where $T1_G$, $T2_G$, $T1_B$, $T2_B$, $T1_R$, and $T2_R$ are the weighted pixel values of the corresponding bin (e.g., values G', B', and R' are computed as linear combinations of the weighted pixel values of the corresponding bin). The parameters $K_{C1}$, $K_{C2}$, and $K_{C3}$ may be weighting factors that depend on the weighted short exposure pixel value in that bin 80 and knee points $S_1$ and $S_2$. For example, $K_{C1}$, $K_{C2}$, and $K_{C3}$ may be given by the equations $K_{C1}=(T1_G-S_1)/(S_2-S_1)$, $K_{C2}=(T1_B-S_1)/(S_2-S_1)$, and $K_{C3}=(T1_R-S_1)/(S_2-S_1)$. If desired, different knee points may be used for each color channel.

Figure 6:
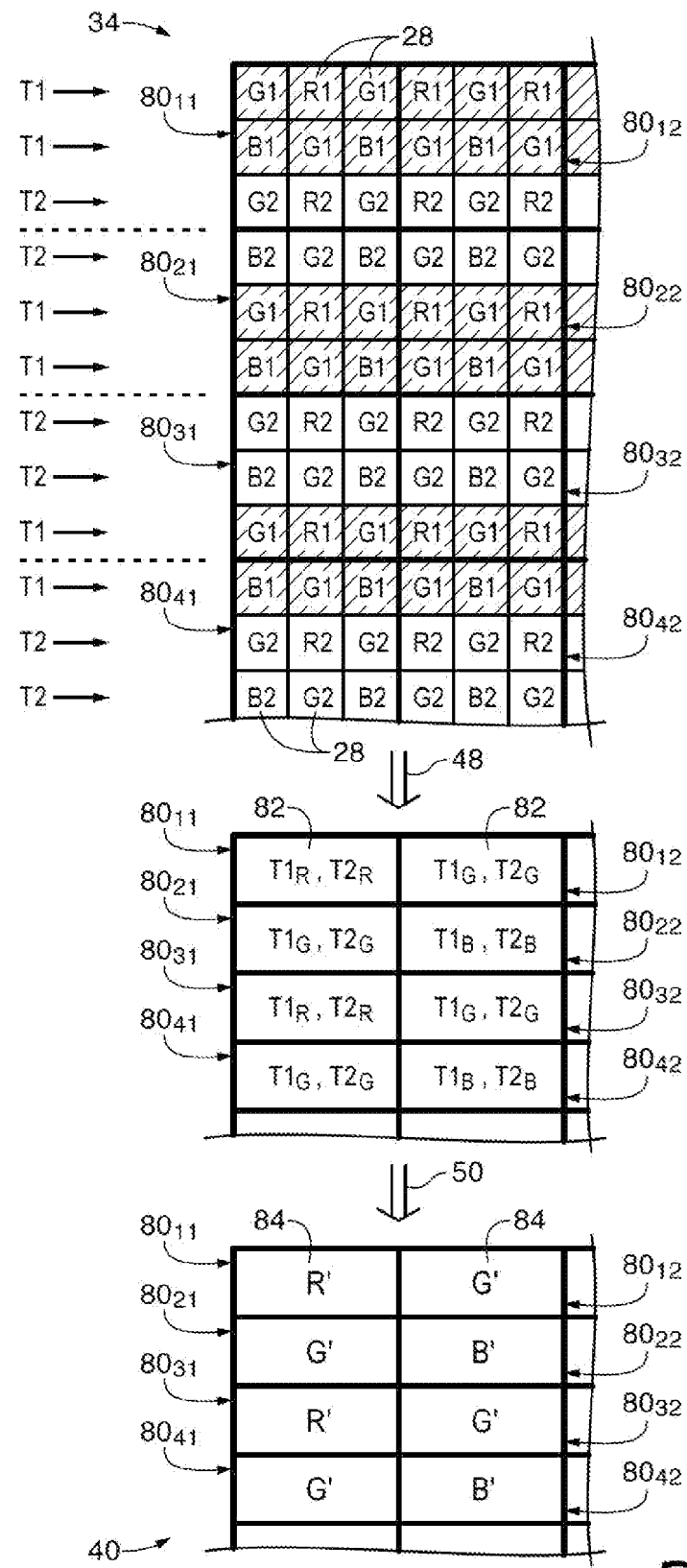

If desired, other symmetries in bins 80 may be used for generating the weighted short and long exposure pixel values. In the example of FIG. 5, weighted green pixel values are computed for bins $80_{11}$, $80_{22}$, $80_{31}$, and $80_{42}$, weighted blue pixel values are computed for bins $80_{21}$ and $80_{41}$, and weighted red pixel values are computed or bins $80_{12}$ and $80_{32}$. FIG. 6 is an illustrative diagram showing another suitable example of how filtering engine 54 may generate a weighted green pixel values $T1_G$ and $T2_G$ for bins $80_{12}$, $80_{21}$, $80_{32}$, and $80_{41}$, weighted blue pixel values $T1_B$ and $T2_B$ for bins $80_{22}$ and $80_{42}$, and weighted red pixel values $T1_R$ and $T2_R$ for bins $80_{11}$ and $80_{31}$. In this way, each bin 80 may correspond to a particular color (e.g., the color for which that bin has both long and short exposure pixel values arranged symmetrically around the center of the bin) that is to be used for generating a corresponding binned HDR pixel value 84 (e.g., the binned HDR value may only include pixel data associated with a single corresponding color).

Filtering engine 54 may process interleaved image 34 (e.g., while performing the operations of step 48 of FIG. 4) to generate weighted pixel values 82 for each bin 80. If desired, filtering engine 54 may perform different weighted averages for bins 80 based on the arrangement of long and short exposure rows within the bin and based on which color has both long and short exposure pixel values in the bin (e.g., different weighted averages having different weighting factors). For example, filtering engine 54 may perform first weighted averages for bin $80_{11}$, second weighted averages for bin $80_{12}$, third weighted averages for bin $80_{21}$, fourth weighted averages for bin $80_{22}$, fifth weighted averages for bin $80_{31}$, sixth weighted averages for bin $80_{32}$, seventh weighted averages for bin $80_{41}$, eighth weighted averages for bin $80_{42}$, etc.

In the example of the arrangement of FIG. 6, the green pixel values 28 in bins 80 for which weighted green pixel values are generated may each be labeled based on their relative location within the corresponding bin 80. For example, the green pixel value G1/G2 located in the above the center pixel value of a given bin 80 may be labeled $G_{p,q-1}$, the green pixel value G1/G2 located in below center pixel value of the bin may be labeled $G_{p,q+1}$, the green pixel value G1/G2 located to the left of the center pixel value in the bin may be labeled $G_{p-1,q}$, and the green pixel value G1/G2 located to the right of the center pixel value in the bin may be labeled $G_{p+1,q}$.

As an example, filtering circuitry 54 may generate the weighted short-exposure green pixel value $T1_G$ and weighted long-exposure green pixel value $T2_G$ for pixel value bins 80 having two short exposure rows followed by a single long exposure row (e.g., weighted green pixel values for a bin such as bin $80_{12}$) by computing $T1_G=(G_{p-1,q}+G_{p+1,q}+2^*G_{p,q-1})/4$, and $T2_G=(G_{p,q+1})$.

Filtering circuitry 54 may generate the weighted short-exposure green pixel value $T1_G$ and weighted long-exposure green pixel value $T2_G$ for pixel value bins 80 having a single long exposure row followed by two short exposure rows (e.g., the weighted green pixel value for a bin such as bin $80_{21}$) by computing a weighted average of the long-exposure green pixel values short-exposure green pixels values in that bin. For example, filtering circuitry 54 may generate weighted short-exposure green pixel value $T1_G$ for bin $80_{21}$ by computing $T1_G=(G_{p-1,q}+G_{p+1,q}+2^*G_{p,q+1})/4$ and may generate weighted long-exposure green pixel value $T2_G$ for bin $80_{21}$ by computing $T2_G=(G_{p,q-1})$.

Filtering circuitry 54 may generate the weighted short-exposure green pixel value $T1_G$ and weighted long-exposure green pixel value $T2_G$ for pixel value bins 80 having long and short exposure green pixel values and two long exposure rows followed by a single short exposure rows (e.g., the weighted green pixel value for a bin such as bin $80_{32}$) by computing a weighted average of the long-exposure green pixel values short-exposure green pixels values in that bin. For example, filtering circuitry 54 may generate weighted short-exposure green pixel value $T1_G$ for bin $80_{32}$ by computing $T1_G=(G_{p,q+1})$ and may generate weighted long-exposure green pixel value $T2_G$ for bin $80_{32}$ by computing $T2_G=(G_{p-1,q}+G_{p+1,q}+2^*G_{p,q-1})/4$.

Filtering circuitry 54 may generate the weighted short-exposure green pixel value $T1_G$ and weighted long-exposure green pixel value $T2_G$ for pixel value bins 80 having long and short exposure green pixel values and a single short exposure row followed by two long exposure rows (e.g., the weighted green pixel value for a bin such as bin $80_{41}$) by computing a weighted average of the long-exposure green pixel values short-exposure green pixels values in that bin. For example, filtering circuitry 54 may generate weighted short-exposure green pixel value $T1_G$ for bin $80_{41}$ by computing $T1_G=(G_{p,q-1})$ and may generate weighted long-exposure green pixel value $T2_G$ for bin $80_{41}$ by computing $T2_G=(G_{p-1,q}+G_{p+1,q}+2^*G_{p,q+1})/4$.

If desired, the red pixel values 28 in bins 80 for which weighted red weighted pixel values are generated may each be labeled based on their relative location within the corresponding bin 80. For example, the red pixel value R1/R2 located above the center pixel value of given bin 80 may be labeled $R_{p,q-1}$, and the red pixel value R1/R2 located below the center pixel value of bin 80 may be labeled $R_{p,q+1}$.

Filtering circuitry 54 may generate the weighted short-exposure red pixel value $T1_R$ and weighted long-exposure red pixel value $T2_R$ for pixel value bins 80 having two short exposure rows followed by a single long exposure row (e.g., the weighted red pixel value for a bin such as bin $80_{11}$) by computing a weighted average of the long exposure red pixel values and a weighted average of the short-exposure red pixels values in that bin. For example, filtering circuitry 54 may generate weighted short-exposure red pixel value $T1_R$ for bin $80_{11}$ by computing $T1_R=(R_{p,q-1})$ and may generate weighted long-exposure red pixel value $T2_R$ for bin $80_{11}$ by computing $T2_R=(R_{p,q+1})$.

Filtering circuitry 54 may generate the weighted short-exposure red pixel value $T1_R$ and weighted long-exposure red pixel value $T2_R$ for pixel value bins 80 having two long exposure rows followed by a single short exposure row (e.g., the weighted red pixel values for a bin such as bin $80_{31}$) by computing a weighted average of the long exposure red pixel values and a weighted average of the short-exposure red pixels values in that bin. For example, filtering circuitry 54 may generate weighted short-exposure red pixel value $T1_R$ for bin $80_{31}$ by computing $T1_R=(R_{p,q+1})$ and may generate weighted long-exposure red pixel value $T2_R$ for bin $80_{31}$ by computing $T2_R=(R_{p,q-1})$.

If desired, the blue pixel values 28 in bins 80 for which weighted blue pixel values are generated may each be labeled based on their relative location within the corresponding bin 80. For example, the blue pixel value B1/B2 located above the center pixel value of given bin 80 may be labeled $B_{p,q-1}$, and the blue pixel value B1/B2 located below the center pixel value of bin 80 may be labeled $B_{p,q+1}$.

Filtering circuitry 54 may generate the weighted short-exposure blue pixel value $T1_B$ and weighted long-exposure blue pixel value $T2_B$ for pixel value bins 80 having long and short exposure blue pixel values and a single long exposure row followed by two short exposure rows (e.g., the weighted blue pixel value for a bin such as bin $80_{22}$) by computing a weighted average of the long exposure blue pixel values and a weighted average of the short-exposure blue pixels values in that bin. For example, filtering circuitry 54 may generate weighted short-exposure blue pixel value $T1_B$ for bin $80_{22}$ by computing $T1_B=(B_{p,q+1})$ and may generate weighted long-exposure blue pixel value $T2_B$ for bin $80_{22}$ by computing $T2_B=(B_{p,q-1})$.

Filtering circuitry 54 may generate the weighted short-exposure blue pixel value $T1_B$ and weighted long-exposure blue pixel value $T2_B$ for pixel value bins 80 having long and short exposure blue pixel values and a single short exposure row followed by two long exposure rows (e.g., the weighted red pixel value for a bin such as bin $80_{42}$) by computing a weighted average of the long exposure blue pixel values and a weighted average of the short-exposure blue pixels values in that bin. For example, filtering circuitry 54 may generate weighted short-exposure blue pixel value $T1_B$ for bin $80_{42}$ by computing $T1_B=(B_{p,q-1})$ and may generate weighted long-exposure blue pixel value $T2_B$ for bin $80_{42}$ by computing $T2_B=(B_{p,q+1})$.

In this way, filtering circuitry 54 may generate weighted long and short exposure pixel values for each pixel bin 80. Filtering circuitry 54 may pass the weighted long and short exposure pixel values to HDR image reconstruction engine 56. HDR reconstruction engine 56 may combine the long and short weighted pixel values in each bin 80 to generate binned HDR pixel values 84 of binned HDR image 40 (e.g., a green binned HDR pixel value G' for bins $80_{21}$, $80_{12}$, $80_{32}$, and $80_{41}$, a red binned HDR pixel value R' for bins $80_{11}$ and $80_{31}$, and a blue binned HDR pixel value B' for bins $80_{22}$ and $80_{42}$, etc.). Binned HDR pixel values B', G', and R' may, for example, be generated by using equations 1-3.

The example of FIGS. 5 and 6 are merely illustrative. If desired, any colored pixel values in any desired pattern or arrangement may be used. For example, clear or yellow pixel values may replace the green pixel values shown in FIGS. 5 and 6. If desired, the red and blue pixel values shown in FIGS. 5 and 6 may be swapped. Binning engine 38 may partition interleaved image 34 into bins of any desired size or shape (e.g., bins having corresponding colored pixel values with both long and short exposure times arranged in a symmetric manner about the center of the bin). The linear combination operations performed for generating weighted pixel values 82 and/or binned pixel values 84 may include any desired weighting factors and any desired combination (e.g., summation) of pixel values within the corresponding bin 80.

Figure 7:
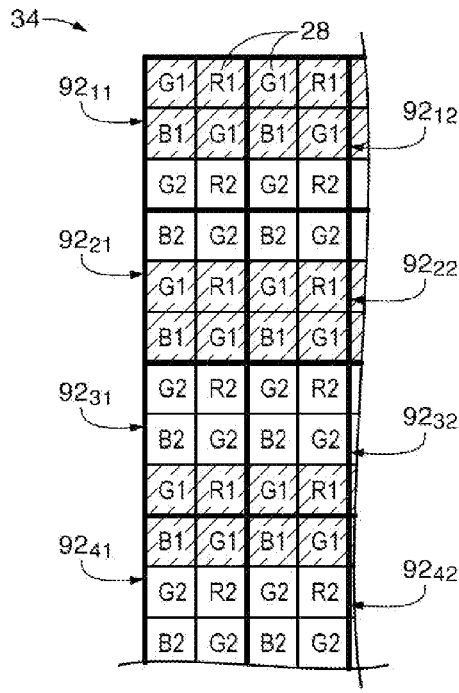
FIG. 7 is an illustrative diagram showing how pixel values in an interleaved image frame may be grouped into corresponding three-pixel by two-pixel regions for generating binned high-dynamic range images in accordance with an embodiment of the present invention.

FIG. 7 is an illustrative diagram showing how binning engine 38 may partition interleaved image 34 into bins 92 having six pixel values 28 arranged in three rows and two columns. Bins 92 may be used to generate weighted short and long exposure pixel values for generating binned HDR image 40 (e.g., by processing the steps of FIG. 4). In the example of FIG. 7, pixel values in bin $92_{11}$ may be used to generate a green binned HDR pixel value 84, pixel values in bin $92_{12}$ may be used to generate a red binned HDR pixel value 84, pixel values in bin $92_{21}$ may be used to generate a blue binned HDR pixel value 84, pixel values in bin $92_{22}$ may be used to generate a green binned HDR pixel value 84, etc. This example is merely illustrative. In general, bins 92 may be used to generate any desired binned HDR pixel values. Bins used for generating binned HDR image 40 may have any desired shape and arrangement of pixel values.

Figure 8:
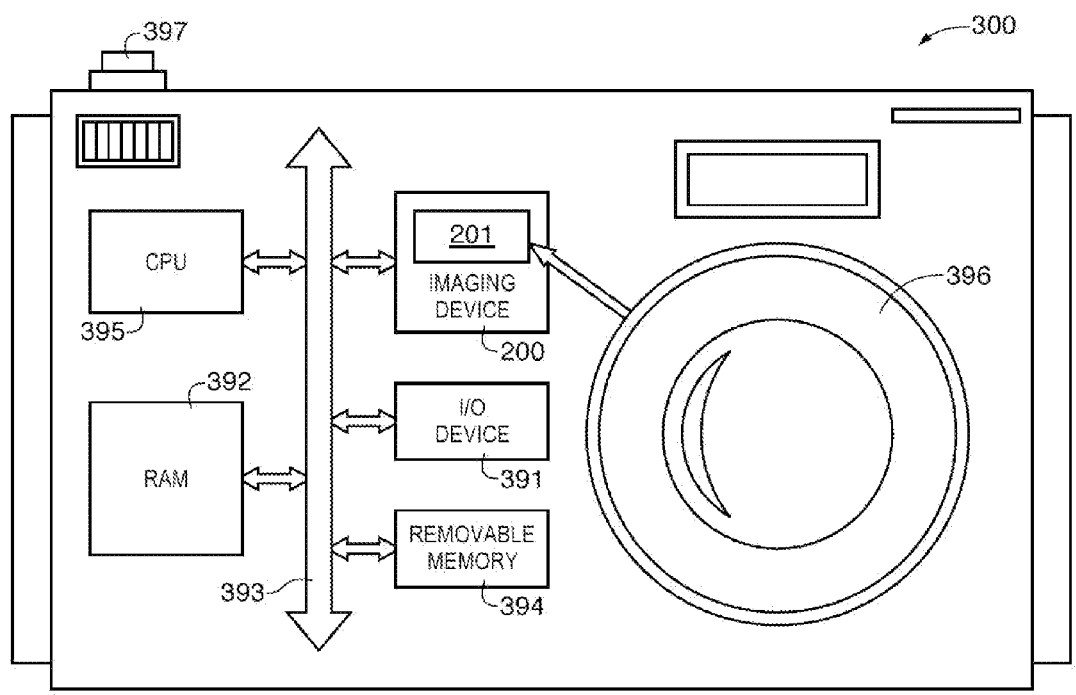
FIG. 8 is a block diagram of a processor system employing the embodiments of FIGS. 1-7 in accordance with an embodiment of the present invention.

FIG. 8 shows in simplified form a typical processor system 300, such as a digital camera, which includes an imaging device such as imaging device 200 (e.g., an imaging device 200 such as camera module 12 of FIG. 1 employing a image processing engine such as image processing engine 36 of FIG. 3 configured to capture binned HDR images as described in FIGS. 1-7. Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating systems and methods for generating binned HDR images of a scene (e.g., for use in performing high definition video capture operations). An imaging system may include an image sensor that captures interleaved high-dynamic-range images having rows of short-exposure pixel values (e.g., pixel values captured during a relatively short integration time) interleaved with rows of long-exposure pixel values (e.g., pixel values captured during a relatively long integration time).

Processing circuitry (e.g., one or more image processing engines) may partition the interleaved high-dynamic-range image into at least first and second pixel value bins (sometimes referred to herein as pixel value sets, groups, zones, or regions). The processing circuitry may generate a weighted long-exposure pixel value by performing a linear combination of long-exposure pixel values in the first pixel value bin and may generate a weighted short-exposure pixel value by performing a linear combination (e.g., weighted average or weighted sum) of short-exposure pixel values in the first pixel value bin. The processing circuitry may generate a binned pixel value of the binned high-dynamic-range image by performing a linear combination of the weighted long-exposure pixel value and the weighted short-exposure pixel value. This process may be repeated for each pixel value bin so that each bin (region) of pixel values in the captured interleaved image has a corresponding weighted short exposure and weighted long exposure pixel value of a corresponding color that are used by the processing circuitry to generate a corresponding binned HDR pixel value of that color for the binned HDR image (e.g., the first pixel value bin may be used to generate a first binned HDR pixel value of a first color by only combining pixel values of the first color in the first bin to generate the first binned HDR pixel value, the second pixel value bin may be used to generate a second binned HDR pixel value of a second color by only combining pixel values of the second color in the second bin to generate the second binned HDR pixel value, etc.).

If desired, each pixel value bin may include pixel values from at least one row of short-exposure pixel values and at least one row of long-exposure pixel values in the captured interleaved HDR image. For example, each pixel value bin may include three (or two) columns of pixel values, two adjacent rows of short-exposure pixel values, and a single row of long-exposure pixel values adjacent to the rows of short-exposure pixel values. In another suitable arrangement, each pixel value bin may include three (or two) columns of pixel values, two adjacent rows of long-exposure pixel values, and a single row of short-exposure pixel values adjacent to the rows of long-exposure pixel values. Each binned HDR pixel value may have a corresponding color.

The binned HDR value may be passed to additional processing circuitry for performing additional image processing operations. In this way, the binned HDR image may require fewer processing resources and less power to process relative to un-binned raw HDR images such as the interleaved HDR image that captured by the image sensor.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of using an imaging system having image processing circuitry to process an interleaved high-dynamic-range image having rows of short-exposure pixel values interleaved with rows of long exposure-pixel values, the method comprising:
    with the image processing circuitry, partitioning the interleaved high-dynamic-range image into at least first and second pixel value bins;
    with the image processing circuitry, generating a weighted long-exposure pixel value by performing a linear combination of long-exposure pixel values in the first pixel value bin;
    with the image processing circuitry, generating a weighted short-exposure pixel value by performing a linear combination of short-exposure pixel values in the first pixel value bin; and
    with the image processing circuitry, generating a binned pixel value by performing a linear combination of the weighted long-exposure pixel value and the weighted short-exposure pixel value.

2. The method defined in claim 1, further comprising:
    with the image processing circuitry, generating an additional weighted long-exposure pixel value by performing a linear combination of long-exposure pixel values in the second pixel value bin;
    with the image processing circuitry, generating an additional weighted short-exposure pixel value by performing a linear combination of short-exposure pixel values in the second pixel value bin; and
    with the image processing circuitry, generating an additional binned pixel value by performing a linear combination of the additional weighted short-exposure pixel value and the additional weighted long-exposure pixel value.

3. The method defined in claim 2, further comprising:
    with the image processing circuitry, outputting a binned high-dynamic-range image to additional image processing circuitry, wherein the binned high-dynamic-range image comprises the binned pixel value and the additional binned pixel value.

4. The method defined in claim 2, wherein the first pixel value bin comprises pixel values from first and second adjacent rows of short-exposure pixel values in the interleaved high-dynamic-range image and pixel values from a first row of long-exposure pixel values that is adjacent to the first and second adjacent rows of short-exposure pixel values in the interleaved high-dynamic-range image.

5. The method defined in claim 4, wherein the second pixel value bin comprises pixel values from second and third adjacent rows of long-exposure pixel values in the interleaved high-dynamic range image and pixel values from a third row of short-exposure pixel values that is adjacent to the second and third adjacent rows of long-exposure pixel values in the interleaved high-dynamic-range image.

6. The method defined in claim 5, wherein the first and second pixel value bins each comprise pixel values from two consecutive columns of pixel values in the interleaved high-dynamic-range image.

7. The method defined in claim 5, wherein generating the weighted long-exposure pixel value by performing the linear combination of long-exposure pixel values in the first bin comprises:
    generating the weighted long-exposure pixel value by computing a weighted average of first and second pixel values in the first row of long-exposure pixel values.

8. The method defined in claim 7, wherein generating the weighted short-exposure pixel value by performing the linear combination of short-exposure pixel values in the first bin comprises:
    generating the weighted short-exposure pixel value by computing a weighted average of first and second pixel values in the first row of short-exposure pixel values and a first pixel value in the second row of short-exposure pixel values, wherein the first pixel value in the second row of short-exposure pixel values is weighted more heavily than the first and second pixel values in the first row of short-exposure pixel values when computing the weighted average.

9. The method defined in claim 8, wherein generating the additional weighted short-exposure pixel value by performing the linear combination of short-exposure pixel values in the second bin comprises:
generating the additional weighted short-exposure pixel value by computing a weighted average of first and second pixel values in the third row of short-exposure pixel values.

10. The method defined in claim 9, wherein generating the additional weighted long-exposure pixel value by performing the linear combination of long-exposure pixel values in the second bin comprises:
generating the additional weighted long-exposure pixel value by computing a weighted average of first and second pixel values in the second row of long-exposure pixel values and a first pixel value in the third row of long-exposure pixel values.

11. The method defined in claim 10, wherein the first and second pixel values in the first row of long-exposure pixel values, the first and second pixel values in the first row of short-exposure pixel values, and the first pixel value in the second row of short-exposure pixel values are pixel values of a first color.

12. The method defined in claim 11, wherein the first and second pixel values in the third row of short-exposure pixel values, the first and second pixel values in the second row of long-exposure pixel values, and the first pixel value in the third row of long-exposure pixel values are pixel values of a second color that is different from the first color.

13. A method of using an image sensor and image processing circuitry to generate a binned high-dynamic-range image, the method comprising:
with the image sensor, capturing a high-dynamic-range image having rows of long-exposure pixel values interleaved with rows of short-exposure pixel values;
with the image processing circuitry, partitioning the captured high-dynamic-range image into a plurality of pixel value regions, wherein each pixel value region comprises pixel values from at least one row of long-exposure pixel values and at least one row of short-exposure pixel values, and wherein each row of long-exposure pixel values and each row of short-exposure pixel values include pixel values from multiple pixel value regions; and
with the image processing circuitry, combining the pixel values in each pixel value region of the plurality of pixel value regions to generate a plurality of binned pixel values for the binned high-dynamic-range image.

14. The method defined in claim 13, wherein combining the pixel values in each pixel value region of the plurality of pixel value regions to generate the plurality of binned pixel values comprises:
computing a weighted average of long-exposure pixel values of a first color in a first pixel value region of the plurality of pixel value regions;
computing a weighted average of short-exposure pixel values of the first color in the first pixel value region; and
generating a first binned pixel value of the first color for the binned high-dynamic-range image by computing a linear combination of the weighted average of the long-exposure pixel values and the weighted average of the short-exposure pixel values of the first color in the first pixel value region.

15. The method defined in claim 14, wherein combining the pixel values in each pixel value region of the plurality of pixel value regions to generate the plurality of binned pixel values further comprises:
computing a weighted average of long-exposure pixel values of a second color that is different from the first color in a second pixel value region of the plurality of pixel value regions;
computing a weighted average of short-exposure pixel values of the second color in the second pixel value region; and
generating a second binned pixel value of the second color for the binned high-dynamic-range image by computing a linear combination of the weighted average of the long-exposure pixel values and the weighted average of the short-exposure pixel values of the second color in the second pixel value region.

16. The method defined in claim 15, wherein partitioning the captured high-dynamic-range image into the plurality of pixel value regions comprises:
partitioning the captured high-dynamic-range image into a first plurality of three pixel value by three pixel value regions that each include two adjacent rows of short-exposure pixel values and a single row of long-exposure pixel values adjacent to the two adjacent rows of short-exposure pixel values; and
partitioning the captured high-dynamic-range image into a second plurality of three pixel value by three pixel value regions that each include two adjacent rows of long-exposure pixel values and a single row of short-exposure pixel values adjacent to the two adjacent rows of long-exposure pixel values.

17. The method defined in claim 16, wherein the first plurality of three pixel value by three pixel value regions comprises the first pixel value region and wherein the second plurality of three pixel value by three pixel value regions comprises the second pixel value region.

18. The method defined in claim 15, wherein partitioning the captured high-dynamic-range image into the plurality of pixel value regions comprises:
partitioning the captured high-dynamic-range image into a first plurality of three pixel value by two pixel value regions that each include two adjacent rows of short-exposure pixel values and a single row of long-exposure pixel values adjacent to the two adjacent rows of short-exposure pixel values; and
partitioning the captured high-dynamic-range image into a second plurality of three pixel value by two pixel value regions that each include two adjacent rows of long-exposure pixel values and a single row of short-exposure pixel values adjacent to the two adjacent rows of long-exposure pixel values.

19. A system, comprising:
a central processing unit;
memory;
input-output circuitry; and
an imaging device, wherein the imaging device comprises:
a pixel array;
a lens that focuses an image onto the pixel array, wherein the pixel array is configured to capture an interleaved high-dynamic-range image having rows of short-exposure pixel values interleaved with rows of long exposure-pixel values; and
processing circuitry, wherein the processing circuitry comprises:
a high-dynamic-range binning engine configured to partition the captured interleaved high-dynamic-range image into at least first and second pixel value zones;
a filtering engine configured to generate a weighted long-exposure pixel value by performing a linear combination of long-exposure pixel values in the first pixel value zone and configured to generate a weighted short-exposure pixel value by performing a linear combination of short-exposure pixel values in the first pixel value zone; and a high-dynamic-range image reconstruction engine configured to generate a combined high-dynamic-range pixel value for a binned high-dynamic-range image by performing a linear combination of the weighted long-exposure pixel value and the weighted short-exposure pixel value.

20. The system defined in claim 19, wherein the filtering engine is further configured to generate an additional weighted long-exposure pixel value by performing a linear combination of long-exposure pixel values in the second pixel value zone and to generate an additional weighted short-exposure pixel value by performing a linear combination of short-exposure pixel values in the second pixel value zone, wherein the high-dynamic-range image reconstruction engine is further configured to generate an additional combined high-dynamic-range pixel value for the binned high-dynamic-range image by performing a linear combination of the additional weighted short-exposure pixel value and the additional weighted long-exposure pixel value, and wherein the system further comprises:

additional image processing circuitry, wherein the high-dynamic-range image reconstruction engine is configured to output the binned high-dynamic-range image to the additional image processing circuitry, and wherein the binned high-dynamic-range image comprises the combined high-dynamic-range pixel value and the additional combined high-dynamic-range pixel value.

* * * * *